United States Patent Office

2,974,140
SUBSTITUTED 2-ALKENYLTETRAHYDRO-1,3-OXAZINES

Willard J. Croxall, Elkhart, Ind., and Jack H. Mellema, Holland, Mich., assignors to Miles Laboratories, Inc., Elkhart, Ind., a corporation of Indiana No Drawing. Filed Mar. 4, 1959, Ser. No. 797,020

7 Claims. (Cl. 260—244)

This invention relates to new and useful chemical compounds and especially to substituted tetrahydro oxazines (also called pentoxazolidines or oxazidines). More specifically, the present invention pertains to 3(2)-(di)-substituted-2-alkenyltetrahydro-1,3 - oxazines corresponding to the following general formula:

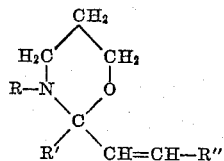

wherein R represents lower alkyl or lower aralkyl groups; R′, hydrogen or lower alkyl groups; and R″, hydrogen or lower alkenyl groups.

Briefly, the novel compositions of this invention are prepared by refluxing N-substituted-N-alkynyl-3-amino-1-propanols with a catalytic amount of potassium hydroxide. In consequence of this treatment, the alkynyl aminopropanols are cyclized to yield substituted alkenyltetrahydro oxazines, as illustrated by the following equation:

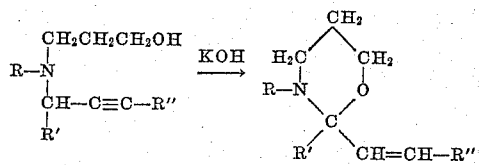

wherein R, R′ and R″ have the meanings ascribed to them above.

The acetylenic aminopropanols used as starting materials for the preparation of the novel compositions, are disclosed in a copending application entitled "Acetylenically Unsaturated Aminopropanols and Process for Their Preparation," U.S. Serial No. 716,854, filed by Willard J. Croxall on February 24, 1958, and assigned to the assignee of the present invention.

More particularly, the subject compounds of this invention are made in accordance with the following process description:

A flask equipped with agitator, condenser, thermometer and dropping funnel is charged with a measured amount of an inert solvent, such as p-xylene, toluene and the like, as well as with a catalytic amount of technical grade potassium hydroxide. This mixture is heated to reflux and stirred. The reflux temperature may range from 110° to 145° C. depending upon the solvent used. The N - substituted - N - alkynyl - 3 - amino - 1 - propanol is then placed in the dropping funnel and added to the reflux mixture in portions of 10 to 30 cc. Refluxing is continued for a period ranging from about 5 minutes to about 4 hours. Then the reaction mixture is cooled to room temperature, filtered to remove the sludge (KOH and some tars), and stripped of solvent under reduced pressure. The desired compound is subsequently obtained upon distillation.

The molecular structure of the subject compounds as drawn above was proven as follows:

An acetylenic aminopropanol was cyclized as described above and distilled so as to obtain a relatively small center fraction. This fraction was subjected to catalytic hydrogenation in a Parr shaker using platinum oxide as catalyst. The calculated amount of hydrogen, namely, one mole per mole of alkenyltetrahydro oxazine, was taken up to indicate the presence of a double bond. The resulting compound was fractionated, and the fraction representing the desired material was collected and analyzed. Analytical values demonstrated that the compound obtained was a tetrahydro oxazine with a saturated side chain of corresponding length.

Identical tetrahydro oxazines with such a saturated side chain were then unequivocally synthesized from an N-substituted-3-amino-1-propanol and an appropriate aldehyde or ketone according to the following equation:

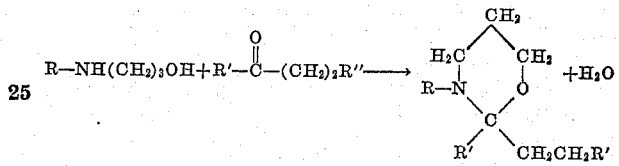

wherein R, R′ and R″ are substituents defined above. Infra-red curves proved that the materials prepared in accordance with the two methods just described were identical.

The novel substituted alkenyltetrahydro oxazines which may be regarded as both allyl ethers and allyl amines, have a great number of applications. They may be polymerized or copolymerized with other polymerizable monomers to form polymers or copolymers having utility, for example, as ion exchange resins and blood extenders. More specifically, for example, when catalyzed with a small amount of peroxide, these tetrahydro oxazines yield thick, clear, adhesive yellow polymers at room temperature, while under heating at 125° for 24 hours they give clear, amber, brittle solids. Moreover, hydroxylated molecules such as those of water, methanol or ethanol undergo additional reactions with the 2-alkenyltetrahydro-1,3-oxazines to produce polymers.

The subject compounds may further be used as chemical intermediates in the preparation of a great number of organic chemicals and as pharmaceutical agents possessing germicidal and hypotensive activity.

The following examples will illustrate in greater detail the various compounds within the scope of this invention and the methods of their preparation:

EXAMPLE I

*3-benzyl-2-vinyltetrahydro-1,3-oxazine*

A. PREPARATION

A one-liter flask was charged with 350 cc. of xylene and 10 g. of technical potassium hydroxide. The flask was equipped with a dropping funnel, thermometer, condenser and agitator. The mixture was heated to reflux and external heat was shut off. Two hundred and three (203) grams of N-benzyl-N-2-propynyl-3-amino-1-propanol were placed in the dropping funnel and added to the refluxing xylene in 20–30 cc. portions so that the mixture was always at reflux. Another 203 g. of the starting material were added in the same manner. The reaction mixture was refluxed for 1 hour longer. Then it was cooled, filter cel was added and the mixture filtered. The filter cake was washed with 150 cc. of xylene. The solvent was removed by distillation. A first fraction was removed to 120° C./2 mm. The desired product was taken as the second fraction from 120 to 130° C./2 mm. A third fraction was distilled from 130 to 165° C./2.8 mm., but its refractive index showed that it was not the same as the second fraction. The second fraction had the following analytical data: Assay 99.15%; $N_D^{25}$ 1.5329. Calcd. for $C_{13}H_{17}NO$: C, 76.85; H, 8.37; N, 6.89. Found: C, 76.98; H, 8.62; N, 6.81.

B. HYDROGENATION

A Parr shaker bottle was charged with 80 g. of the above 2-vinyl-tetrahydro-1,3-oxazine, ¼ g. of platinum oxide and 150 cc. of tetrahydrofuran. This compound was hydrogenated at 50–55° C. at an initial pressure of 52 p.s.i. A total pressure drop of 28 pounds was observed, which corresponds to the theoretical pressure drop. The catalyst was removed by filtration. The solvent was removed by distillation under vacuum. The product was fractionated as follows: first fraction was removed to 140° C./13 mm., 10 g.; second fraction taken from 140 to 143° C./13 mm., 38 g.; third fraction from 143 to 148° C./13 mm., 10.5 g. A residue of 7 g. remained. Analytical data were: first fraction—assay by non-aqueous titration 100.95%, $N_D^{25}$ 1.5220; second fraction—assay 100.95%, $N_D^{25}$ 1.5205. Calcd. for $C_{13}H_{19}NO$: C, 76.09; H, 9.27; N, 6.83. Found: C, 75.81; H, 8.94; N, 6.94. Third fraction—assay 102.4%, $N_D^{25}$ 1.5195.

C. PREPARATION OF HYDROGENATED COMPOUND BY ALTERNATE METHOD

A one-liter flask equipped with an agitator and Dean Stark trap surmounted with a condenser was charged with 330 g. of N-benzyl-3-amino-1-propanol, 350 cc. of benzene and 116 g. of propionaldehyde. This mixture was heated to reflux and 38 cc. of water were removed at the trap. The benzene was removed by distillation under reduced pressure. A first fraction reached 146° C./17 mm. The product distilled at 146–147° C./17 mm. The second fraction was refractionated carefully as follows: fraction A was removed from 96 to 101° C./.6 mm., fraction B, at 98–101° C./.6 mm. and fraction C, from 101 to 107° C./.6 mm. Analytical data on fraction B were: assay by non-aqueous titration 101.2%, $N_D^{25}$ 1.5195. Calcd. for $C_{13}H_{19}NO$: C, 76.09; H, 9.27; N, 6.83. Found: C, 75.60; H, 9.51; N, 7.40. This was submitted for infra-red analysis along with the hydrogenated sample from above. The two curves varied in that the curve for the synthetically prepared sample showed the presence of an aldehyde group, indicating inefficient fractionation. This sample was refractionated taking a small center fraction distilling at 140–141° C./10 mm. This sample had an infra-red curve identical to that of the hydrogenated compound.

EXAMPLE II

*3-isopropyl-2-vinyltetrahydro-1,3-oxazine*

A one-liter flask equipped as described above was charged with 300 cc. of xylene and 10 g. of potassium hydroxide. This mixture was heated to reflux. N-isopropyl-N-2-propynyl-3-amino-1-propanol (213 g.) was placed in the dropping funnel and added portion-wise (10–15 cc.) causing vigorous refluxing after each addition. The reaction mixture was refluxed for 15 more minutes and then cooled to room temperature. While the sludge was removed by filtration, the solvent and a first fraction were removed by distillation to 72° C./9 mm. A second fraction was distilled from 72 to 76° C./9 mm. and 148 g. were thus obtained. A third fraction was removed at 77–78° C./9 mm.; its weight was 18.5 g. The second fraction assayed 96% by non-aqueous titration and the third fraction, 104.5%. The second fraction was refractionated as follows: A forerun was removed to 73.5° C./10 mm. weighing 4.5 g. A large fraction was taken from 73.5 to 74° C./10 mm. weighing 111 g. The residue was beginning to decompose, and the distillation was stopped. Analytical data for this large fraction were: assay by non-aqueous titration 98.48%; $N_D^{25}$ 1.4618. Calcd. for $C_9H_{17}NO$: C, 69.68; H, 10.97; N, 9.03. Found: C, 70.30; H, 10.04; N, 9.77.

EXAMPLE III

*3-isobutyl-2-vinyltetrahydro-1,3-oxazine*

Fifty cc. of toluene and 3 g. of potassium hydroxide were placed in a 500 cc. flask and heated to reflux. N-isobutyl-N-2-propynyl-3-amino-1-propanol (36 g.) was placed in the dropping funnel and added within 3 to 4 minutes. External heat was supplied to maintain the reaction mixture at reflux. Reflux was continued for 5 more minutes. After cooling, the sludge was removed by filtration and the solvent, by distillation under vacuum. A first fraction was removed to 84° C./16 mm.; a second fraction from 84 to 89° C./16 mm.; and a third fraction from 89 to 105° C./16 mm. The second fraction weighed 19.2 g.; the third fraction, 5 g. Seven and one-half grams of residue remained. Analytical data for the desired compound distilled as second fractions were: assay, by non-aqueous titration, 99.1%; $N_D^{25}$ 1.4562. Calcd. for $C_{10}H_{19}NO$: C, 71.0; H, 11.2; N, 8.3. Found: C, 68.44; H, 11.56; N, 8.52.

EXAMPLE IV

*3-benzyl-2-n-propyl-2-vinyltetrahydro-1,3-oxazine*

A one-liter flask was charged with 300 cc. of xylene and 1 g. of potassium hydroxide. After heating the mixture to reflux, 200 g. of N-benzyl-N-(1-n-propyl-2-propynyl)-3-amino-1-propanol were placed in the dropping funnel, and while external heat was continued, it was added portionwise (10–15 cc. at one time) allowing the reaction mixture to come to reflux after each addition. Five additional grams of potassium hydroxide were then added. Reflux was continued for two hours. Then the reaction mixture was filtered through filter cell to remove the sludge and the xylene was removed by distillation at reduced pressure. Material was distilled from 140 to 165° C./4 mm. but redistilled yielding a first fraction from 115 to 125° C./0.4 mm., weighing 52 g. and a second fraction from 125 to 135° C./0.4 mm., weighing 47 g. and assaying 104% by non-aqueous titration. Analytical data for the first fraction were: assay 100.8%; $N_D^{25}$ 1.5285. Calcd. for $C_{16}H_{23}NO$: C, 78.46; H, 9.87; N, 4.97. Found: C, 78.3; H, 9.45; N, 5.7.

EXAMPLE V

*3-isobutyl-2-(3'-methyl-1',3'-butadienyl)tetrahydro-1,3-oxazine*

A one-liter flask was charged with 50 cc. of toluene and 10 g. of potassium hydroxide. The mixture was heated to reflux and heat was shut off. N-isobutyl-N-(4 - methyl - 4 - penten - 2 - ynyl) - 3 - amino - 1 - propanol (166.5 g.) was added in 15–20 cc. portions through a dropping funnel over a period of 5 minutes. Each addition caused the reaction mixture to reflux vigorously. Reflux was maintained for 10 more minutes. The reaction mixture was then cooled to 25° C. and filtered to remove the sludge. The solvent was removed by distillation under reduced pressure to 100° C./12 mm. No first fraction was obtained but from 125 to 132° C./12 mm. 123.5 g. of the desired product were removed. Analysis: Assay by non-aqueous titration 99.1%; $N_D^{25}$ 1.4864. Calcd. for $C_{13}H_{23}NO$: C, 74.7; H, 11.0; N, 6.7. Found: C, 74.24; H, 10.47; N, 7.53.

EXAMPLE VI

*3-isopropyl-2-n-propyl-2-(3'-methyl-1',3'-butadienyl)tetrahydro-1,3-oxazine*

A one-liter flask was charged with 300 cc. of xylene and 10 g. of potassium hydroxide. After heating the mixture to reflux, 212 g. of N-isopropyl-N-(1-n-propyl-4- methyl-4-penten-2-ynyl)-3-amino-1-propanol were added in small portions. After the addition was completed the reflux was continued for one-half hour. Then the reaction mixture was cooled, filtered and the solvent was removed by distillation. The material was distilled under reduced pressure from 65 to 130° C./1.5 mm.; residue was decomposing and gassing. Redistillation yielded a first fraction from 52 to 95° C./.17 mm., weighing 15 g., and a second fraction from 95 to 110° C./0.17 mm., weighing 41 g. Analytical data of the second fraction were: assay by non-aqueous titration 96.48%; $N_D^{25}$ 1.5200. Calcd. for $C_{15}H_{27}NO$: C, 75.95; H, 11.39; N, 5.91. Found: C, 76.03; H, 10.84; N, 5.42.

In summary, the present invention relates to 3(2)-(di)substituted-alkenyltetrahydro-1,3-oxazines as represented by the general formula given above. Their chief utility resides in their ability to polymerize. The preferred embodiments are 3-substituted-2-vinyl- and butadienyltetrahydro-1,3-oxazines.

What is claimed is:

1. A substituted alkenyltetrahydro-1,3-oxazine having the formula

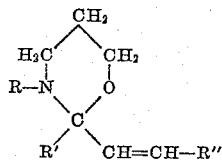

wherein R is a substituent selected from the group consisting of lower alkyl and lower phenalkyl groups; R' is a substituent selected from the group consisting of hydrogen and lower alkyl groups and R" is a substituent selected from the group consisting of hydrogen and lower alkenyl groups.

2. 3-benzyl-2-vinyltetrahydro-1,3-oxazine.
3. 3-isobutyl-2-vinyltetrahydro-1,3-oxazine.
4. 3-benzyl-2-n-propyl-2-vinyltetrahydro-1,3-oxazine.
5. 3 - isobutyl - 2 - (3' - methyl - 1',3' - butadienyl)tetrahydro-1,3-oxazine.
6. 3 - isopropyl - 2 - n - propyl - 2 - (3' - methyl - 1', 3'-butadienyl)tetrahydro-1,3-oxazine.
7. A process for the preparation of novel substituted alkenyl-tetrahydro-1,3-oxazines which comprises refluxing an N-substituted-N-alkynyl-3-amino-1-propanol of the general formula $$\begin{array}{c} CH_2CH_2CH_2OH \\ | \\ R-N \\ | \\ CHC{\equiv}C-R'' \\ | \\ R' \end{array}$$

wherein R is a substituent selected from the group consisting of lower alkyl and lower phenalkyl groups; R' is a substituent selected from the group consisting of hydrogen and lower alkyl groups and R" is a substituent selected from the group consisting of hydrogen and lower alkenyl groups, in the presence of an inert organic solvent and a catalytic amount of potassium hydroxide for a period ranging from a few minutes to about 4 hours at a temperature of from 110°–145° C.; removing the unreacted constituents from the reaction mixture and distilling the desired product therefrom.

References Cited in the file of this patent
UNITED STATES PATENTS
2,831,858    De Benneville _____ Apr. 22, 1958